United States Patent [19]

Solar et al.

[11] Patent Number: 5,958,490

[45] Date of Patent: Sep. 28, 1999

[54] CONTROLLED RELEASE FUMIGATION OF HARVESTED AGRICULTURAL COMMODITIES

[75] Inventors: Jose M. Solar, Sheperdstown; Charles L. Wilson, Martinsburg, both of W. Va.; Ahmed El Ghaouth, Frederick, Md.

[73] Assignee: The Unites States of America, as represented by the Secretary of Agriculture, Washington, D.C.

[21] Appl. No.: 08/336,080

[22] Filed: Nov. 7, 1994

[51] Int. Cl.⁶ .......................................................... A23B 4/16
[52] U.S. Cl. .......................... 426/312; 426/320; 426/331; 426/333; 426/335; 426/418; 426/419
[58] Field of Search ...................... 426/312, 320, 426/419, 331, 333, 335, 418

[56] References Cited

U.S. PATENT DOCUMENTS

| | | | |
|---|---|---|---|
| 3,608,085 | 9/1971 | Papworth | 424/317 |
| 4,350,709 | 9/1982 | Vidal et al. | 426/319 |
| 4,401,673 | 8/1983 | Martel et al. | 424/263 |
| 4,450,169 | 5/1984 | Nezot et al. | 424/270 |
| 5,019,595 | 5/1991 | Yano et al. | 514/531 |
| 5,063,771 | 11/1991 | Vacquer | 73/40.7 |
| 5,110,594 | 5/1992 | Morita | 424/405 |
| 5,180,586 | 1/1993 | Sato et al. | 424/405 |

OTHER PUBLICATIONS

An 90–206656 "Freshness Preserving Agent for Flowers, Fruits, Vegatable Comprises Palladium CPP Absorbed on Carbon Black Particles". (No Date).

*Primary Examiner*—Lien Tran
*Attorney, Agent, or Firm*—M. Howard Silverstein; John D. Fado; Janelle S. Graeter

[57] ABSTRACT

A fumigant which is effective for the control of postharvest disease in agricultural commodities utilizes carbon supports impregnated with natural volatiles to provide controlled release of the volatiles in storage containers and facilities. Activated carbon is an effective carbon support, while essential oils and benzaldehyde are useful natural volatiles.

7 Claims, 3 Drawing Sheets

6,958,490

CONTROLLED RELEASE FUMIGATION OF HARVESTED AGRICULTURAL COMMODITIES

BACKGROUND OF THE INVENTION

1. Field of the Invention

Fumigation has been an important means of controlling pests in agricultural commodities, and the process has generally been carried out using synthetic chemical pesticides and fumigants. The withdrawal of key chemicals from the market due to environmental and consumer safety concerns, however, has necessitated a search for effective alternatives to these substances. This invention relates to safe and effective replacements for current fumigation methods and compositions.

2. Description of the Prior Art

Methyl bromide is currently the most common fumigant used to control plant pests. The Montreal Protocol 1991 Assessment indicated that it was in a category of chemicals allegedly responsible for depleting the stratospheric ozone layer, the EPA indicated that action would be carried out under the Clean Air Act which calls for a phaseout of chemicals threatening the ozone layer by the year 2000. Annual losses to U.S. producers and consumers resulting from a ban of the agricultural uses of methyl bromide are estimated to be approximately $1.3 to $1.4 billion. According to industry sources, approximately 64 million pounds of methyl bromide were used in the United States in 1990, of which 5 million pounds were used for postharvest and quarantine treatments. Major crop losses are expected to be encountered in fresh market tomatoes, ornamentals, tobacco, peppers and strawberries if effective alternatives to methyl bromide are not found. A significant portion of the loss would be borne by U.S. consumers.

It has also been demonstrated that several naturally-occurring plant volatiles are effective for control of postharvest decay in a variety of agricultural commodities (Wilson et al., *Plant Disease.* 1987. vol. 71, pp. 316–319). However, in many cases it has been found that prolonged exposure of the commodities to these volatiles results in deleterious physiological changes in plant materials resulting in tissue deterioration (Stewart et al., *Hort. Sci.* 1980. vol. 15, pp. 148–149; Aharoni and Stadelbacher, *Phytopathology.* vol. 63, 544–545),manifesting itself as severe browning and development of water soaked areas. For this reason, these compounds have largely been unused for this purpose.

These events have thus provided an incentive for researchers to search for alternative fumigation and pest control means for the protection of postharvest agricultural commodities.

SUMMARY OF THE INVENTION

We have discovered that carbon supports are effective carriers in the controlled release of volatile substances, including fumigants and pesticides. We have thus developed a formulation that permits the delivery of non-phytotoxic concentrations of pesticidal volatiles that reduce the incidence of decay without causing tissue damage. The formulation includes a selected natural volatile adsorbed onto a carbon carrier and permits the controlled release of the volatile into the atmosphere. In accordance with this discovery, it is an object of the invention to provide a controlled-release composition comprising a carbon carrier onto which a volatile which is effective as a fumigant and/or pesticide has been adsorbed.

It is also an object of the invention to provide a method for treating agricultural commodities using the controlled release composition.

Other objects and advantages of the invention will become readily apparent from the following description.

DETAILED DESCRIPTION OF THE INVENTION

Figure 1:
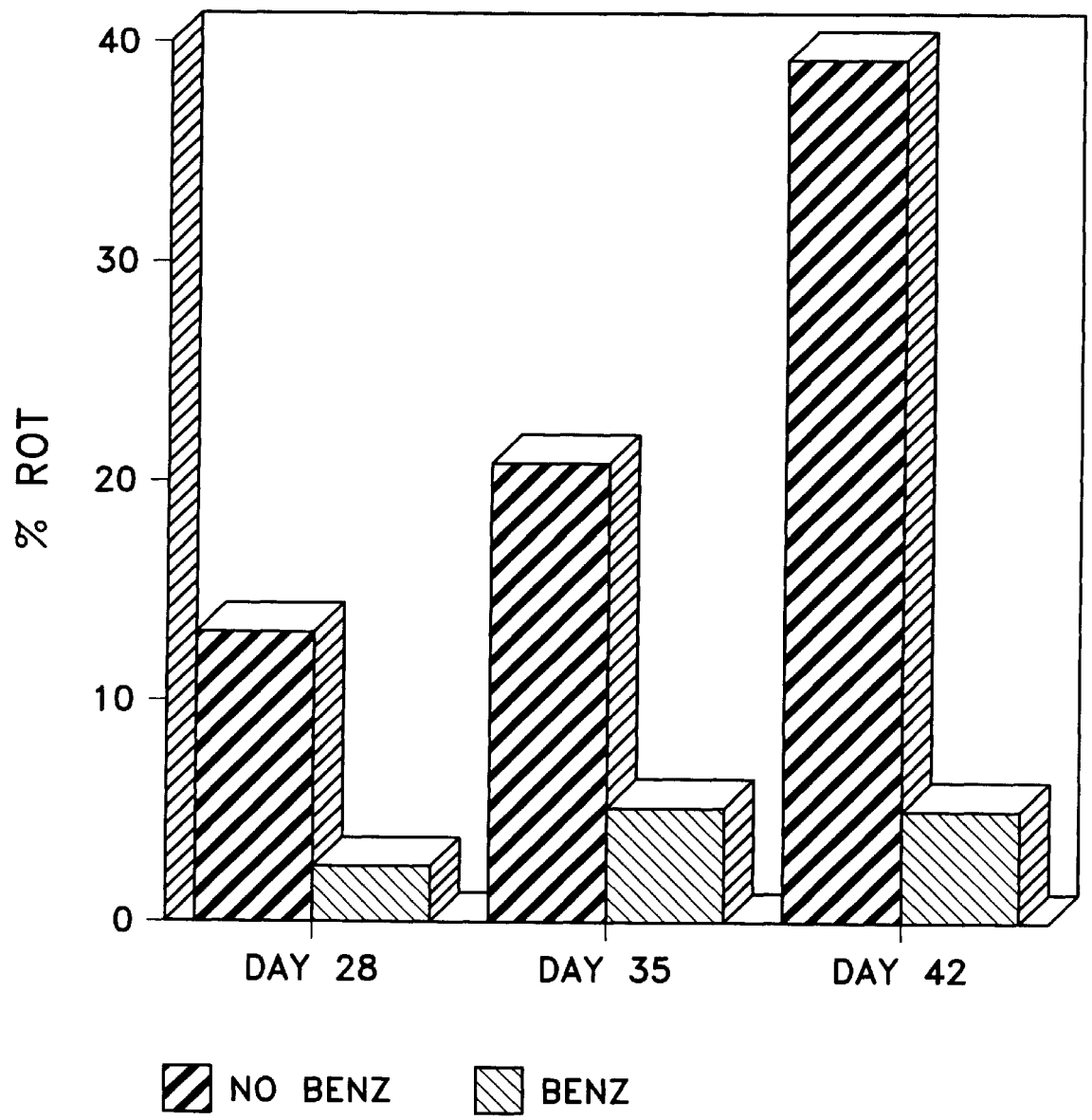
FIG. 1 shows strawberries fumigated with Benzaldehyde impregnated carbon.

The adsorption capability of some carbon-containing materials is well-known, however, their ability to sustain the controlled release of volatile compounds over a period of time as fumigants has heretofore been largely unrecognized. The special characteristics that make carbons attractive as supports include ready availability and low cost, inertness and stability under usage conditions, high surface area, controllable (within limits) pore size distribution and favorable mechanical properties, such as crushing strength and abrasion resistance. To some extent, adsorption always occurs when a clean solid surface is exposed to a condensable vapor. In selected carbons, the amount of adsorbed gas is enhanced as a result of their large surface area per unit mass. Surface area is in turn a function of particle size, particle shape and porosity. Invariably, the amount adsorbed on a solid surface will also depend upon the absolute temperature T, the partial pressure P, and the interaction potential E between vapor (adsorbate) and the surface (adsorbent). Therefore, at some equilibrium pressure and temperature the weight W of gas adsorbed on a unit weight of adsorbent is given by:

$$W = F(PTE).$$

The equation is practically applied through an adsorption isotherm, which is the relationship between the partial pressure of the adsorbate and the amount adsorbed at equilibrium at a constant temperature. The shape of the isotherm is a function of the nature of the adsorbent and adsorbate. Using empirical data obtained under isothermal conditions, a graph of W vs P is constructed for subsequent use as a reference.

Optimal fumigating performance, for a given fumigant, can be achieved by judicious selection of the parameters of the adsorbent carbon carrier, including internal and external surface area, unimodal or multimodal pore size distribution (or apertures leading into larger pores), pore shape (cylindrical-, slit-shaped or both), surface energetic heterogeneity, surface chemical and physical texture. Important characteristics of the adsorbate molecules to consider include minimum molecular cross-sectional area, molecular symmetry, heat of adsorption, and desired level of fumigant saturation. By taking these factors into consideration, volatiles are successfully impregnated onto carbon microporous surface and subsequently desorb in a highly controlled manner.

The carbon-supported fumigant can be placed inside cartridges similar to those used in safety equipment respirator masks. The carbon support also serves to adsorb molecules which are detrimental to agricultural commodities during storage thereby increasing the effectiveness of the fumigants. An added advantage provided by the novel fumigant is that deleterious molecules are also removed from the environment of the storage facility while fungicidal molecules are introduced. Thus, for the purpose of fumigating agricultural commodities, the adsorption properties of the carbon carriers are considered in combination with their desorption properties. Adsorption also diminishes the partial pressure of adsorbates which are detrimental to agricultural commodities during storage, thereby increasing the number of compounds which can be effectively utilized.

The cost of fumigation can be lowered by recycling carbon carriers. The carbon material can be reused by desorbing unwanted compounds by heat treating the support and subsequently reimpregnating with active fungicidal compound, thus rejuvenating the fumigant.

The fumigant is prepared by impregnating a carbon carrier with an effective volatile. For purposes of this invention, effective volatiles are essential oils, d-limonene, hexyl acetate, isopentyl acetate, methyl isovalerate, δ-dodecalactone, γ-decalactone, γ-octalactone, benzyl acetate, benzaldehyde, benzyl alcohol, γ-caprolactone and γ-valerolactone. Preferred volatiles are essential oils and benzaldehyde, while benzaldehyde is particularly preferred. Effective carbon carriers are carbon blacks (including furnace blacks, channel blacks, thermal blacks and lamp blacks), carbon black composites, glassy carbons, polymer derived carbons and activated carbons. The latter includes activated carbons derived from anthracite and bituminous coal, coke, carbonized shells, peat, olive stones, etc. Preferred carriers are carbon blacks and activated carbons, while activated carbons are particularly preferred. The carbon carrier is impregnated by contacting the carrier with the volatile until a sufficient amount has been adsorbed.

For liquid volatiles, the carbon carrier is impregnated to incipient wetness by adding the desired liquid dropwise to the carbon support, in an amount corresponding to the total pore volume of the support. The pore volume of the support is determined by liquid titration to the point of incipient wetness (Solar et al., 1991. *J. of Catalysis*. vol. 129. pp. 330–342, herein incorporated by reference).

For gaseous volatiles, the carbon carrier is impregnated by placing the carbon support in a large container saturated with gaseous volatile for a time sufficient for the gas to be adsorbed.

The fumigant is applied by placing a portion of the impregnated carbon inside an open container adjacent to the stored agricultural commodity. The container opening is preferably covered by filter paper or cloth material, permitting the volatile to escape but retaining it inside the container.

The fumigation process is applicable to any postharvest agricultural commodities in storage, especially those susceptible to fungal decay, and includes fruits, vegetables, nuts and grains (Nandi and Fries, *J. of Plant Diseases and Protection*. 1976. vol. 83(5), pp. 284–294). It may also be utilized for soil fumigation.

The following examples are intended only to further illustrate the invention and are not intended to limit the scope of the invention as defined by the claims.

EXAMPLES

Example I

Fumigant Preparation

The fumigant was prepared by impregnating 15 g of a commercial carbon (Sigma Chemical Company, St. Louis, Mo.) with benzaldehyde (Sigma, supra) to incipient wetness by adding 43 ml benzaldehyde. The uptake of benzaldehyde by the carbon was approximately 3 ml/g of carbon. By gas chromatography it was found that, at room temperature, the partial pressure of adsorbed benzaldehyde in the head space of a closed container was about 0.5 to 0.2 that of the partial pressure of 4 ml of liquid benzaldehyde held in an open petri dish.

Example II

Fumigant Evaluation Using Strawberries

Fumigant was prepared according to Example I, and strawberries were used to evaluate its efficacy. Equal numbers of fresh strawberries (19) were placed in each of four equal volume (10 l) closed containers. Inside two of the containers, a 4 g portion of the fumigant was placed in the middle. The other two containers were used as controls. The four containers were placed in cold storage maintained between 4° C. and 6° C. The number of strawberries decomposed by natural fungal decay were counted at seven-day intervals.

Results are presented in FIG. 1 where it can be seen that the percentage of necrotic fruit, within the time period of the experiment, is higher in the containers which do not contain fumigant. Additionally, the untreated strawberries became necrotic at an exponential rate over time. In contrast, in the presence of fumigant, strawberries had a slight increase in percentage of necrotic fruit over time, then remained virtually constant. No fumigant damage on the strawberries was observed.

Example III

Fumigant Evaluation Using Apples

Fumigant was prepared as described in Example I, and apples were used to evaluate its efficacy. Equal numbers of fresh apples (19) were placed in each of 4 equal volume (10 l) closed containers. With the apples inside container 1, a 4 g portion of the fumigant was placed in the middle. Container 2 was used as a control for container 1 and contained no fumigant. In containers 3 and 4, the apples were wounded with a 3-mm nail penetrating the apple 1 cm and inoculated with *Botrytis cinerea* (*B. cinerea*, 100 spores/wound). In container 3, a 4 g portion of the fumigant was placed in the middle. Container 4 was used as a control for container 3 and contained no fumigant. The four containers were placed in cold storage maintained between 4° C. and 6° C.

Figure 2:
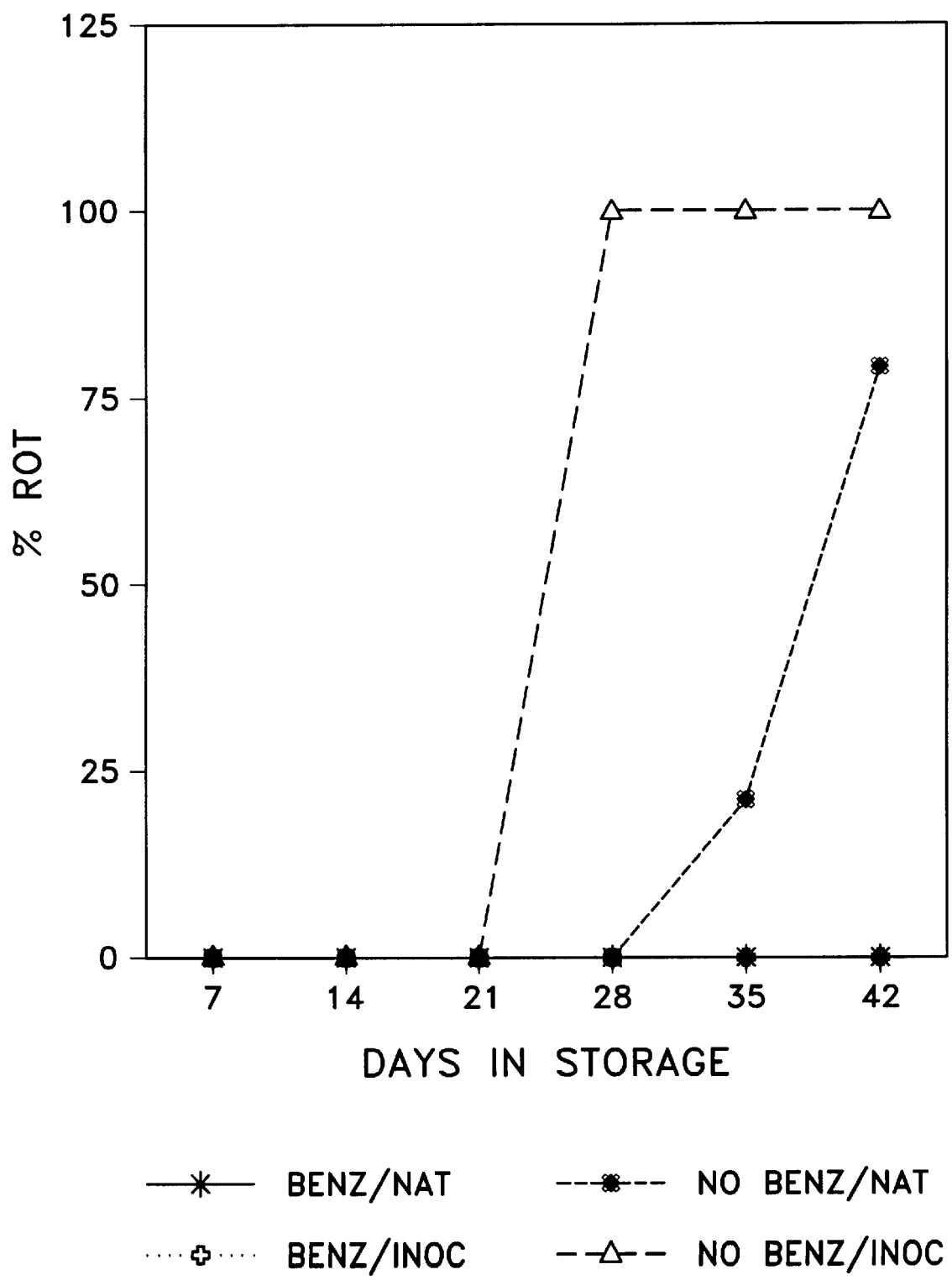
FIG. 2 shows apples fumigated with Benzaldehyde impregnated carbon.

Results are presented in FIG. 2 where it can be seen that the apples that were not in the presence of fumigant rotted significantly sooner than the apples which were fumigated. Additionally, the apples which were inoculated with *B. cinerea* reached 100% rotting about 17 days earlier than the set of apples which were rotted by natural fungi. The apples which were fumigated showed no signs of tissue damage after 42 days of storage.

Example IV

Fumigant Evaluation Using Peaches

Fumigant was prepared according to Example I, and peaches were used to compare the efficacy of benzaldehyde impregnated onto a carbon carrier and liquid benzaldehyde. Peaches (3) were placed in 10 separate 3-liter closed containers. In 5 of the containers, 3 ml benzaldehyde was deposited in an open petri dish. In 5 containers, 3 g fumigant was placed in an open polyethylene bottle. The containers were subsequently placed on top of the laboratory counter at ambient temperature. Controls with no fumigant were also included.

Figure 3:
FIG. 3 shows peaches fumigated with Benzaldehyde.

Results are shown in FIG. 3 where it can be seen that peaches which were fumigated with benzaldehyde deposited in the petri dish were highly prone to physiological breakdown which in turn expedited and facilitated attack from natural fungal infection. Within 4 to 5 days of storage, all peaches in this set reached 100% decomposition. In contrast, the set of peaches fumigated with the benzaldehyde-impregnated carbon were preserved for longer periods of time (20 days or more) without signs of decomposition. This significant difference in decomposition rate is attributed to the fact that the partial pressure of benzaldehyde in the petri dish samples is higher than the partial pressure of benzaldehyde in the carbon-supported fumigated samples. In the carbon-supported benzaldehyde, the benzaldehyde is released in a controlled and as-needed manner by the carbon.

With each of the three agricultural commodities, in each of which storage rot is extremely important to control, it has been shown that, relative to untreated fruit, fumigation with benzaldehyde-impregnated carbon can significantly lengthen the time the commodities can remain stored by minimizing rotting caused by both natural infection and inoculated fungi. Furthermore, fumigation with carbon impregnated with benzaldehyde proved superior to liquid benzaldehyde fumigation. This is attributed to the slow controlled release of the fumigant made possible by the physical properties of the adsorbent carbon.

We claim:

1. A fumigant comprising a carbon support impregnated with to permit a delivery of non-phytotoxic concentrations of the benzaldehyde to reduce incidence of decay without causing tissue damage to agricultural commodities.

2. The controlled-release fumigant of claim 1, wherein the carbon support is selected from the group consisting of a carbon black, a carbon black composite, a glassy carbon, a polymer-derived carbon and an activated carbon.

3. The controlled-release fumigant of claim 2, wherein the carbon support is a carbon black or an activated carbon.

4. The controlled-release fumigant of claim 2, wherein the carbon support is an activated carbon.

5. The controlled-release fumigant of claim 2 or 3, wherein the carbon black is a furnace black, a channel black, a thermal black or a lamp black.

6. The controlled-release fumigant of claim 2, 3 or 4, wherein the activated carbon is derived from anthracite or bituminous coal, coke, carbonized shells, peat or olive stones.

7. A method of treating an agricultural commodity for the control of postharvest disease, said method comprising adding a controlled-release fumigant to a storage compartment containing said agricultural commodity in an amount effective for controlling said postharvest disease, wherein said controlled-release fumigant is a carbon support impregnated with to permit a delivery of non-phytotoxic concentrations of the benzaldehyde to reduce incidence of decay without causing tissue damage to said agricultural commodity.

* * * * *

UNITED STATES PATENT AND TRADEMARK OFFICE
CERTIFICATE OF CORRECTION

PATENT NO. : 5,958,490
DATED : September 28, 1999
INVENTOR(S) : J. Solar et al.

It is certified that error appears in the above-identified patent and that said Letters Patent is hereby corrected as shown below:

In claim 1, line 2, insert --benzaldehyde-- between "with" and "to"

and

In claim 7, line 7, insert --benzaldehyde-- between "with" and "to"

Signed and Sealed this

Thirty-first Day of October, 2000

Attest:

Q. TODD DICKINSON

*Attesting Officer*     *Director of Patents and Trademarks*